Jan. 31, 1967       H. H. MALLEY       3,301,528
AEROFOIL SHAPED BLADE FOR FLUID FLOW MACHINES
Filed Oct. 13, 1965

Inventor
Harry Hardley Malley
By
Cushman, Darby & Cushman
Attorneys

United States Patent Office 3,301,528
Patented Jan. 31, 1967

3,301,528
AEROFOIL SHAPED BLADE FOR FLUID FLOW MACHINES
Harry Hartley Malley, Derby, England, assignor to Rolls-Royce Limited, Derby, England, a British company
Filed Oct. 13, 1965, Ser. No. 495,464
Claims priority, application Great Britain, Nov. 13, 1964, 46,447/64
8 Claims. (Cl. 253—39.15)

This invention concerns an aerofoil shaped blade for use in a fluid flow machine, e.g., a turbine blade of a gas turbine engine.

Different spanwise parts of such a blade become differently heated in use and it is therefore desirable to cool them to different extents.

Accordingly, therefore, to the present invention, there is provided an aerofoil shaped blade which is adapted for use in a fluid flow machine, said blade including a blade root and working surfaces which are, in operation, exposed to fluid flow, said blade having a duct therein for the passage of a cooling fluid therethrough, at least that portion of the duct which is internally of said working surfaces having a substantially constant cross-sectional area throughout its length, the ratio of the length of the periphery of the said portion at any cross section to the area thereof at the said cross section varying from one part of the said portion to at least one other part thereof.

The greater the value of the said ratio at any cross section, the greater will be the effect at that cross section of any given flow of cooling fluid therethrough. Thus, if it is desired to cool one part of the blade more than another, this may be achieved by ensuring that the said ratio is higher in the said part of the blade than elsewhere.

Preferably, the said portion of the duct extends from the root to the tip of the blade.

There is preferably a substantial difference in the said ratio between the root and the tip of the blade.

The blade may be a turbine blade of a gas turbine engine and the invention also comprises a gas turbine engine whose turbine is provided with such blades.

Additionally, the invention comprises a blade as set forth above when made by initially forming the blade so that the said portion is of constant cross-sectional shape throughout its length, and thereafter forging the blade between tapered dies so that more deformation occurs in one part of the blade than another.

The invention is illustrated, merely by way of example, in the accompanying drawings, in which.

Figure 1:
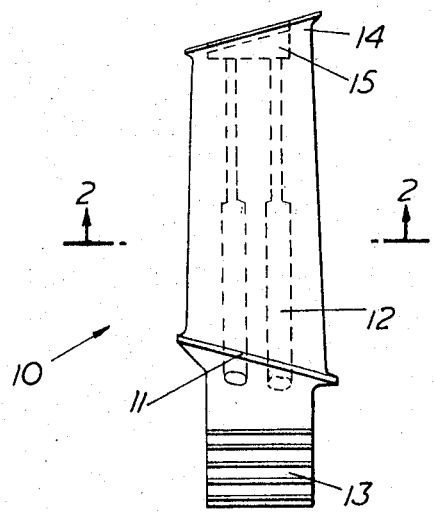
FIGURE 1 is an elevation of a turbine blade of a gas turbine engine.
Figure 2:
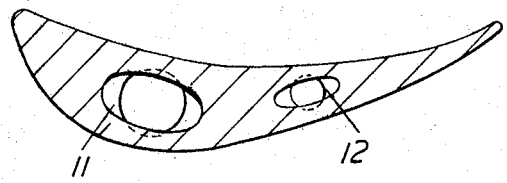
FIGURE 2 is a section taken on the line 2—2 of FIGURE 1.

Referring to the drawings, a turbine blade 10 of a gas turbine engine (not shown) has two ducts 11, 12 therein for the passage of a cooling fluid therethrough. Each of the ducts 11, 12 extends from the root portion 13 of the blade to adjacent the tip portion 14 thereof. The ducts 11, 12 are provided at the root portion 13 with a supply of cooling air from the engine compressor, by means not shown, the ducts 11, 12 communicating with each other by way of a space 15.

Each of the ducts 11, 12 has a substantially constant cross sectional area throughout its length. The ratio of the length of the periphery of each of the ducts 11, 12 adjacent the root portion 13 to the cross sectional area at the root portion 13 is substantially greater than the value of the said ratio adjacent the tip portion 14. This has the effect that the blade is given greater cooling in the root portion 13 than in the tip portion 14 of the blade.

Equally, of course, if it is desired to cool the tip portion 14 more than the root portion 13, the said ratio may be arranged to be greater at the tip portion than at the root portion.

The differences in the value of the said ratio along the length of the ducts 11, 12 may be achieved by initially forming the blade 10 so that the ducts 11, 12 are each initially of constant cross sectional shape throughout their length, the blade being thereafter forged between tapered dies so that there is greater deformation in the root portion 13 than in the tip portion 14 of the blade.

It will be appreciated that, instead of changing the circumference/area ratio abruptly adjacent the said span of the blade, the ratio could vary linearly along the span of the blade.

I claim:

1. An aerofoil-shaped blade which is adapted for use in a fluid flow machine, said blade including a blade root and working surfaces, which are, in operation, exposed to fluid flow, said blade having a duct therein for the passage of a cooling fluid therethrough, at least that portion of the duct which is internally of the working surfaces having a constant cross sectional area throughout its length, the ratio of the length of the periphery of the said portion of said duct at any cross section to the area thereof at the said cross section varying from one part of the said portion to at least one other part thereof.

2. A blade as claimed in claim 1 in which the said portion extends from the root to the tip of the blade.

3. A blade as claimed in claim 2 in which there is a substantial difference in the said ratio between the root and the tip of the blade.

4. A blade as claimed in claim 1 in which the blade is a turbine blade of a gas turbine engine.

5. A blade as claimed in claim 1 wherein said ratio changes abruptly adjacent the span of the blade.

6. A blade as claimed in claim 1 wherein said ratio varies linearly along the span of the blade.

7. A method of making an aerofoil-shaped blade for a turbine of a gas turbine engine or the like, the blade having at least one cooling duct within a portion of the blade exposed to fluid flow capable of cooling different parts thereof to different degrees at predetermined positions therealong, comprising the steps of: initially forming the blade with the cooling duct in the portion of the blade thereby exposed to fluid flow being formed of a constant cross sectional area and shape throughout its length in the portion, and then reworking the blade and duct at the predetermined positions therealong to change the external shape of the blade and the cross sectional shape of the duct while maintaining the cross sectional area of the duct constant throughout its length so that the ratio of the length of the periphery of the duct to the cross sectional area varies along the length of the blade of the predetermined positions.

8. A method as claimed in claim 7 in which the reworking of the blade and the duct is accomplished by forging the blade between tapered dies.

References Cited by the Examiner

UNITED STATES PATENTS

| 2,972,805 | 2/1961 | Hignette et al. | 253—39.15 X |
| 2,972,806 | 2/1961 | Hignette et al. | 253—39.15 X |
| 2,985,953 | 5/1961 | Eccles | 253—39.15 X |
| 3,044,153 | 7/1962 | Kent et al. | 253—39.15 X |

FOREIGN PATENTS 855,684    12/1960    Great Britain.

MARTIN P. SCHWADRON, Primary Examiner.

EVERETTE A. POWELL, JR., Examiner.